(12) United States Patent
Jung

(10) Patent No.: US 8,609,242 B2
(45) Date of Patent: Dec. 17, 2013

(54) NON-FLAMMABLE CUSHIONING AND SEALING SHEET AND METHOD FOR PREPARING THE SAME

(75) Inventor: Min-Gi Jung, Suwon-Si (KR)

(73) Assignee: UTIS Co., Ltd. (KR)

( * ) Notice: Subject to any disclaimer, the term of this patent is extended or adjusted under 35 U.S.C. 154(b) by 186 days.

(21) Appl. No.: 13/141,431

(22) PCT Filed: Dec. 16, 2009

(86) PCT No.: PCT/KR2009/007539
§ 371 (c)(1),
(2), (4) Date: Jun. 22, 2011

(87) PCT Pub. No.: WO2010/074451
PCT Pub. Date: Jul. 1, 2010

(65) Prior Publication Data
US 2011/0256382 A1    Oct. 20, 2011

(30) Foreign Application Priority Data
Dec. 23, 2008  (KR) .......... 10-2008-0132461

(51) Int. Cl.
*B32B 27/08* (2006.01)
*B32B 5/16* (2006.01)
*B32B 27/40* (2006.01)
*B05D 5/10* (2006.01)

(52) U.S. Cl.
USPC .......... 428/339; 428/354; 428/337; 428/336; 428/423.1; 428/424.2; 428/424.4; 427/207.1; 427/208

(58) Field of Classification Search
USPC .......... 428/343, 354, 339, 334, 336, 337, 428/423.1, 424.2, 424.4; 427/207.1, 208
See application file for complete search history.

(56) References Cited

U.S. PATENT DOCUMENTS

| | | | | |
|---|---|---|---|---|
| 4,948,648 A | * | 8/1990 | Dadgar et al. | 428/71 |
| 6,866,928 B2 | * | 3/2005 | Narum et al. | 428/354 |
| 2007/0021516 A1 | * | 1/2007 | Hansel et al. | 521/99 |
| 2007/0066745 A1 | * | 3/2007 | Beele | 524/495 |
| 2008/0241529 A1 | * | 10/2008 | Bauer et al. | 428/355 R |

FOREIGN PATENT DOCUMENTS

| | | |
|---|---|---|
| KR | 1020040099130 | 11/2004 |
| KR | 10-2006-0117935 | 11/2006 |
| KR | 10-0878752 | 1/2009 |

* cited by examiner

*Primary Examiner* — Thao T. Tran
(74) *Attorney, Agent, or Firm* — Cantor Colburn LLP

(57) ABSTRACT

The present invention relates to a non-flammable cushioning and sealing sheet and, more particularly to, a sheet having a sequential layered structure of an adhesive layer, a polyurethane layer, and a surface coating layer, the polyurethane layer containing melamine polyphosphate and diphenyl cresyl phosphate as a flame retardant.

The present invention also relates to a method for preparing a non-flammable cushioning and sealing sheet that comprises: preparing a polyurethane layer containing melamine polyphosphate and diphenyl cresyl phosphate as a flame retardant; forming a adhesive layer on the one side of the polyurethane layer; and forming a surface coating layer on the other side of the polyurethane layer where the adhesive layer is not formed.

20 Claims, 1 Drawing Sheet

NON-FLAMMABLE CUSHIONING AND SEALING SHEET AND METHOD FOR PREPARING THE SAME

CROSS-REFERENCE TO RELATED APPLICATIONS

This application is the U.S. National Phase of PCT/KR2009/007539 filed Dec. 16, 2009, which claims priority of Korean Patent Application 10-2008-0132461 filed Dec. 23, 2008.

TECHNICAL FIELD

The present invention relates to a sheet for absorbing impact and sealing having improved flame-retardant and preparation method the same.

BACKGROUND OF ART

Electronic equipment such as cellular phone, hard disk drive (HDD), television, or liquid crystal display (LCD) consists of precision parts and electronic elements. The electronic equipment is likely to be broken down or damaged under externally imposed physical impacts and susceptible to external contaminants such as dirt, which interfere air circulation in the electronic equipment to cause overheating of the electronic elements and consequently reduce the life span of the electronic equipment.

To solve these problems, the electronic equipment generally uses polyurethane foam as a material for absorbing external impacts and sealing cracks on the enclosure. Polyurethane foam is a light-weighted porous material excellent in cushioning and sealing properties but very inflammable to cause fast flame spread with great heat dissipation, which adversely affects the electronic equipment, so the electronic equipment after long-term use or in severe environment is likely to ignite when maintained at high temperature for a long time due to heat generation from the electronic elements. For that reason, increasing attention has been directed to the techniques to provide cushioning and sealing sheets with non-flammability.

On the other hand, those materials that are commonly used as a flame retardant comprise halogen-based flame retardant, phosphor-based flame retardant, melamine-based flame retardant, antimony trioxide, or metallic hydroxides. The halogen-based flame retardant generates halogen-based compounds adversely affecting the environment and is not considered as an appropriate flame retardant. Antimony trioxide is also an inappropriate flame retardant due to its adverse effect on the environment. The metallic hydroxides are free from the problem with the halogen-based flame retardant or antimony trioxide in regard to environment. But, a large amount of metallic hydroxides is required to achieve the inherent purpose of the flame retardant, non-flammability, and ends up with a deterioration of the basic properties of the cushioning and sealing sheet.

DISCLOSURE OF INVENTION

Technical Problem

Accordingly, it is an object of the present invention to provide a non-flammable cushioning and sealing sheet that is provided in the interior/exterior of electronic equipment not only to prevent damages of parts from external impacts and intrusion of contaminants such as dirt from the outside but also to implement the intrinsic functions of the sheet even under high temperature or heat dissipation condition caused by heat generated from the elements of the electronic equipment.

It is another object of the present invention to provide a method for preparing the sheet.

Technical Solution

To achieve the objects, the present invention provides a non-flammable cushioning and sealing sheet having a sequential layered structure comprising an adhesive layer, a polyurethane layer, and a surface coating layer, the polyurethane layer containing melamine polyphosphate and diphenyl cresyl phosphate as a flame retardant.

The present invention also provides a method for preparing the sheet.

Advantageous Effects

The non-flammable cushioning and sealing sheet of the present invention is provided in the interior/exterior of electronic equipment not only to prevent damages of parts from external impacts and intrusion of contaminants such as dirt from the outside but also to implement intrinsic functions of the sheet even under high temperature or heat dissipation condition caused by heat generated from the elements of the electronic equipment, and thereby can be widely used for a variety of electronic equipment.

EXPLANATION AS TO REFERENCE NUMERALS

Figure 1:
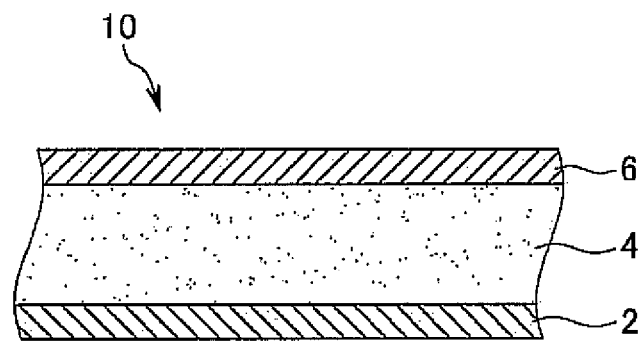
FIG. 1 is a cross-sectional view of a non-flammable cushioning and sealing sheet according to an embodiment of the present invention.

10: Non-flammable cushioning and sealing sheet
20: Non-flammable cushioning and sealing sheet further comprising adhesive auxiliary layer
2: Adhesive layer
4: Polyurethane layer
6: Surface coating layer
8: Adhesive auxiliary layer

BEST MODE FOR CARRYING OUT THE INVENTION

Hereinafter, a description will be given as to a non-flammable cushioning and sealing sheet and a method for preparing the sheet according to the preferred embodiments of the present invention with reference to the accompanying drawings.

The inventors of the present invention have been making studies on a cushioning and sealing sheet that is not harmful to the environment but is rendered to have non-flammability as well as general properties of cushioning and sealing sheets.

As will be described later in further detail, the non-flammable cushioning and sealing sheet according to the embodiment of the present invention is provided with non-flammability as well as equivalent or superior properties compared to the conventional sealing sheets and applied in the interior/ exterior of electronic equipment not only to prevent damages of parts from external impacts and intrusion of contaminants such as dirt from the outside but also to implement the intrinsic functions of the sheet under high temperature or heat dissipation condition caused by heat generated from the elements of the electronic equipment. In addition, the non-flammable cushioning and sealing sheet according to the embodiment of the present invention uses none of the halogen-based flame retardants, causing no environmental load, but instead, uses a combination of melamine- and phosphor-based flame retardants to exhibit sufficient non-flammability even under heat dissipation condition after a long-term use of the electronic equipment.

The non-flammable cushioning and sealing sheet according to an embodiment of the present invention has a sequential layered structure comprising an adhesive layer, a polyurethane layer, and a surface coating layer, and the polyurethane layer contains melamine polyphosphate and diphenyl cresyl phosphate as a flame retardant. FIG. 1 is a cross-sectional view of the non-flammable cushioning and sealing sheet according to the embodiment of the present invention. Referring to FIG. 1, the non-flammable cushioning and sealing sheet 10 of the present invention has a sequential layered structure comprising an adhesive layer 2, a polyurethane layer 4, and a surface coating layer 6.

Figure 2:
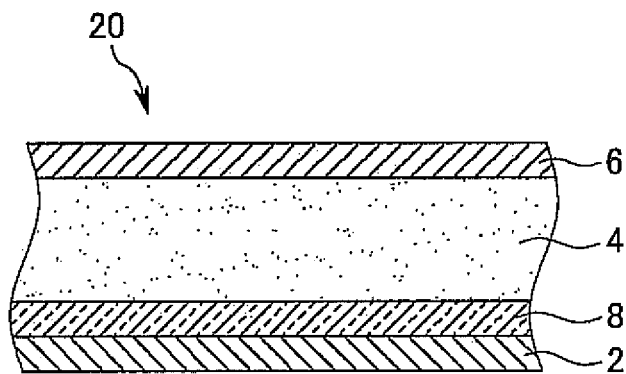
FIG. 2 is a cross-sectional view of a non-flammable cushioning and sealing sheet further comprising an adhesive auxiliary layer according to another embodiment of the present invention.

In another embodiment of the present invention, there is provided a sheet further comprising an adhesive auxiliary layer between the adhesive layer and the polyurethane layer. FIG. 2 is a cross-sectional view of a sheet 20 according to the embodiment of the present invention that further comprises an adhesive auxiliary layer 8. Referring to FIG. 2, the sheet 20 has a sequential layered structure of adhesive layer 2, adhesive auxiliary layer 8, polyurethane layer 4, and surface coating layer 6.

Hereinafter, a detailed description will be given as to the individual component layers comprised in the sheet according to the embodiments of the present invention.

Polyurethane Layer

The polyurethane layer 4, when the sheet is installed in the interior/exterior of electronic equipment, directly absorbs and disperses external impacts to protect the electronic equipment and acts as a sealant for preventing intrusion of external contaminants. The polyurethane layer 4 also provides the sheet with non-flammability to accomplish the intrinsic function of the sheet even under high temperature or heat dissipation condition caused by heat generated from the elements of the electronic equipment.

The material for the polyurethane layer 4 comprises flexible polyurethane, semi-rigid polyurethane, or rigid polyurethane. Flexible polyurethane is preferred.

In accordance with an embodiment of the present invention, the polyurethane layer 4 is prepared from a composition comprising: 100 parts by weight of a polyol mixture; 50 to 130 parts by weight of a prepolymer; and, as a flame retardant, 50 to 70 parts by weight of melamine polyphosphate and 10 to 20 parts by weight of diphenyl cresyl phosphate.

The polyol mixture comprises at least one polyol selected from the group consisting of polypropylene glycol, polytetramethylene glycol, polyethylene glycol, or 1,4-butanediol.

The polyol mixture further comprises a catalyst, which is not specifically limited and may comprise a catalyst generally used for crass-linking reaction of resins, preferably dibutyl tin dilaurate.

The prepolymer is a mixture of diisocyanate and polyol, and preferably comprises: at least one diisocyanate selected from the group consisting of methylene diphenyl isocyanate (MDI), toluene diisocyanate (TDI), methylene diphenyl isocyanate (MDI) oligomer, toluene diisocyanate (TDI) oligomer, or carbodiimide-modified methylene diisocyanate; and at least one polyol selected from the group consisting of polypropylene glycol, polytetramethylene glycol, or polyethylene glycol.

The content of the prepolymer is preferably 50 to 130 parts by weight with respect to 100 parts by weight of the polyol mixture. In other words, the content of the prepolymer is preferably at least 50 parts by weight with respect to 100 parts by weight of the polyol mixture in order to at least form the polyurethane layer, and at most 130 parts by weight to prevent a deterioration of the properties (such as specific gravity or compressive strength) of the polyurethane layer when added in excess.

The composition for preparation of the polyurethane layer 4 comprises a flame retardant to provide non-flammability.

The flame retardant is preferably melamine polyphosphate and diphenyl cresyl phosphate, and preferably comprises a mixture containing 50 to 70 parts by weight of melamine polyphosphate and 10 to 20 parts by weight of diphenyl cresyl phosphate with respect to 100 parts by weight of the polyol mixture. The content of the melamine polyphosphate less than 50 parts by weight or the content of the diphenyl cresyl phosphate less than 10 part by weight with respect to 100 parts by weight of the polyol mixture hardly implement non-flammability sufficiently; while the content of the melamine polyphosphate greater than 70 parts by weight and the content of the diphenyl cresyl phosphate greater than 20 parts by weight deteriorate the mechanical properties of the sheet to end up with a deterioration of the cushioning and sealing properties.

The flame retardant as used herein may be in the solid or liquid state and present as particles dispersed in the polyurethane layer 4. The solid flame retardant is not specifically limited in particle size and may preferably have an average particle diameter of 10 to 50 μm. The average particle diameter of the flame retardant less than 10 μm causes a deterioration of the reactivity of polyurethane, while the average particle diameter of the flame retardant greater than 50 μm results in poor dispersibility of the flame retardant.

The composition for preparation of the polyurethane layer 4 may comprise a foaming agent for foaming the polyurethane layer. The foaming agent as used herein is not specifically limited and may be any one such as water ($H_2O$) as known to those skilled in the art. The content of the foaming agent is determined in consideration of the quantity and foaming degree of the composition and not specifically limited.

The composition for preparation of the polyurethane layer 4 may further comprise a cross-linking agent in order to accelerate the rate of the cross-linking reaction between the polyol compound and the prepolymer and to form sufficient cross-links. The content of the cross-linking agent is preferably in the range of 0 to 100 parts by weight with respect to 100 parts by weight of the prepolymer.

The cross-linking agent may be any one generally used for polymerization reaction of polymers and comprises, if not specifically limited to, at least one selected from the group consisting of trimethylpropane, triethanol amine, pentaerythritol, toluene diamine, ethylene diamine, glycerine, oxypropylated ethylene diamine, hexamethylene diamine, m-phenylene diamine, diethanol amine, or triethanol amine.

The polyurethane layer 4 may be prepared from the composition comprising the above-mentioned component ingredients.

The polyurethane layer 4 is prepared in the form of sheet and by a processing method as known to those skilled in the art, such as extrusion molding, injection molding, calendaring, inflation, or casting.

The thickness of the polyurethane layer 4 is dependent upon the type of electronic equipment and may be preferably at least 0.4 mm in order to maintain the least cushioning effect and at most 3.5 mm to maintain the sealing effect on the extremely rough surface of the electronic equipment and to realize slim and light electronic equipment.

Adhesive Layer

The adhesive layer 2 laminated on the one side of the polyurethane layer 4 renders the sheet adhesive and enables the sheet to stick on the interior/exterior of electronic equipment.

The adhesive layer 2 may be prepared from an adhesive composition known to those skilled in the art and not specifically limited. Preferably, the adhesive layer 2 is prepared from acryl-based monomer, acryl-based oligomer, acryl-based polymer, acetate-based polymer, or styrene-based polymer, and more specifically, at least one selected from the group consisting of vinylacetate, methylmethacrylic acid, ethylacetoacrylate, or sulfonated polystyrene.

The adhesive layer 2 is required to have a property for rendering the sheet sticky to electronic equipment with enough adhesiveness, and preferably has a peel strength of at least 150 gr/cm in order to prevent the sheet from being dislocated during the assembling or use of the product.

The thickness of the adhesive layer 2 is adjustable depending on the adhesive characteristic of the material and preferably at least 5 μm in order to maintain the least adhesiveness and at most 120 μm to prevent the sheet from being unnecessarily thick.

Surface Coating Layer

The surface coating layer 6 comprised in the sheet of the present invention is formed on the one side of the polyurethane layer 4 and disposed on the outermost of the sheet to act as a sealant for preventing intrusion of contaminants in the electronic equipment, protecting the surface of the sheet and providing the surface of the sheet with an appropriate friction resistance, thereby realizing the preparation of the sheet in the form of a roll.

The material for the surface coating layer 6 is a coating material known to those skilled in the art and may comprise, if not specifically limited to, at least one selected from the group consisting of: an acryl-based polymer prepared from an acryl-based monomer or oligomer comprising silicon acrylate, silicon methacrylate, acrylic acid, methacrylic acid, methylmethacrylate, or methylmethacrylic acid; a urethane-acrylate copolymer or blend; or a vinyl-based polymer comprising polyethylene, polypropylene, polyvinylidene fluoride, or Teflon.

Preferably, the surface coating layer 6 has a peel strength of at least 50 gr/cm with respect to the polyurethane layer 4 in order to prevent from being peeled from the polyurethane layer 4.

The thickness of the surface coating layer 6 is adjustable depending on the characteristic of the material and preferably in the range of 0.5 to 10 μm in order to prevent intrusion of contaminants in the electronic equipment, protect the surface of the sheet, and provide an appropriate friction resistance on the surface of the sheet, thereby producing the sheet in the form of a roll.

Adhesive Auxiliary Layer

In the non-flammable cushioning and sealing sheet according to the present invention, the adhesive auxiliary layer 8 is an additional layer optionally given to provide the sheet 20 with far more stable adhesiveness.

Preferably, the adhesive auxiliary layer 8 is laminated between the adhesive layer 2 and the polyurethane layer 4 and composed of a composition having good compatibility with the materials of the adhesive layer 2 and the polyurethane layer 4.

More specifically, the adhesive auxiliary layer 8 is prepared from at least one selected from the group consisting of urethane acrylate having vinyl groups at the terminal of urethane; a copolymer of urethane acrylate and acryl-based monomer; or a urethane-acryl mixture.

Preferably, the adhesive auxiliary layer 8 has a thickness of 0.5 to 10 μm, and a peel strength of at least 300 gr/cm with respect to the polyurethane layer 4.

As described above, the sheet according to the embodiments of the present invention may have a sequential layered structure of adhesive layer 2, polyurethane layer 4 and surface coating layer 6 (in FIG. 1); or a sequential layered structure of adhesive layer 2, adhesive auxiliary layer 8, polyurethane layer 4 and surface coating layer 6 (in FIG. 2).

The sheet of the present invention is not limited to the above construction, since the individual component layers of the sheet are given only for an exemplary embodiment of the present invention and other component layers known to those skilled in the art may also be overlying or underlying the respective component layers.

Preferably, the above-constructed sheet of the present invention, when applied to electronic products, has a permanent compression set of 0.1 to 10% in order to prevent permanent deformation after an elapse of long time.

Preferably, the sheet of the present invention has a specific gravity of 0.2 to 0.45 g/cm$^3$ not only to prevent an extreme deterioration of the mechanical properties and a strong force from being imposed on the electronic equipment during assembling but also to exhibit a sufficient cushioning performance.

The sheet of the present invention, due to a flame retardant contained in the polyurethane layer 4, meets the UL94 HBF flame retardant requirements. Hence, the sheet can be widely used as a sealing sheet for electronic equipment that requires non-flammability (the UL94 HBF standards will be specified in the following experimental example).

The non-flammable cushioning and sealing sheet of the present invention is excellent in cushioning and sealing properties with non-flammability that eliminates the risk of heat generation or fire, and hence can be widely applied to electronic equipment used under high temperature atmosphere or severe environment.

On the other hand, a method for preparing a non-flammable cushioning and sealing sheet according to another embodiment of the present invention comprises: preparing the polyurethane layer 4 containing melamine polyphosphate and diphenyl cresyl phosphate as a flame retardant; forming the adhesive layer 2 on the one side of the polyurethane layer 4; and forming the surface coating layer 6 on the other side of the polyurethane layer 4 where the adhesive layer 2 is not formed.

The individual component layers, comprising polyurethane layer 4, adhesive layer 2, and surface coating layer 6, are constructed in the same manner as described previously on the sheet according to the embodiments of the present invention.

The sheet can be prepared by forming the surface coating layer 6 and the adhesive layer 2 directly on the polyurethane layer 4; or preparing the individual component layers in the form of films and then laminating the films together.

In the former method, where the surface coating layer 6 and the adhesive layer 2 are formed directly on the polyurethane layer 4, the sheet is prepared by normal techniques such as screen printing, spray coating, or doctor blade coating depending on the viscosity of the composition for the surface coating layer or the adhesive layer composition.

In the latter method, where the individual component layers are prepared in the form of separate films and then laminated together, the composition for each component layer is applied or sprayed on a separate release film and removed of the release film, and the individual component layers are laminated together.

MODE FOR THE INVENTION

Hereinafter, the present invention will be described in further detail with reference to the examples and comparative examples, which are not intended to limit the scope of the present invention.

Examples 1 to 6

100 parts by weight of polypropylene glycol (LUPRANOL L1100 (MW: 1,100), supplied by BASF) and 600 parts by weight of methylene diphenyl isocyanate (supplied by TCI) were stirred under nitrogen atmosphere at 80□ for 4 hours to prepare a prepolymer.

220 parts by weight of polypropylene glycol (LUPRANOL L1100 (MW: 1,100), supplied by BASF), 620 parts by weight of polypropylene glycol (LUPRANOL L2030 (MW: 3,100), supplied by BASF), 90 parts by weight of 1,4-butanediol (supplied by Acros) and 0.3 parts by weight of dibutyl tin dilaurate (T-12, supplied by Air product Inc.) as a catalyst were added under reduced pressure and stirred at 50□ for 4 hours to prepare a polyol mixture.

To the polyol mixture were added a flame retardant and a foaming agent, of which the contents (in parts by weight with respect to 100 parts by weight of the polyol mixture) are given in Table 1.

90 parts by weight of the prepolymer was added to 100 parts by weight of the polyol mixture, and the resultant mixture was agitated at 25□ for 10 seconds, applied on a release paper and cured at 90□ for 6 hours to prepare a 1 mm-thick polyurethane layer.

Subsequently, a mixed solution comprising 100 parts by weight of urethane acrylate (CN962, supplied by Sartomer) and 3 parts by weight of silica (Silisya SY-161, supplied by Fuji-Silysia) was applied on the polyurethane layer and UV-cured to prepare a 2 μm-thick surface coating layer.

A 120 m-thick acryl-based double-coated adhesive tape (EAD 217, supplied by 3M) having a peel strength of 450 gr/cm was laminated on the other side of the polyurethane layer where the surface coating layer was not formed, to complete a cushioning and sealing sheet.

Comparative Examples 1 and 2

Commercially available polyurethane foam sheets were prepared as Comparative Example 1 (Esorba-SRP[SR A-SD], supplied by SK UTIS Co., Ltd.) containing 0.3 parts by weight of a foaming agent without a flame retardant and Comparative Example 2 (Esorba-SRP[SR C-SD], supplied by SK UTIS Co., Ltd.) containing 0.8 parts by weight of a foaming agent without a flame retardant.

The individual polyurethane foam sheets were laminated on a commercially available polyethylene terephthalate sheet (SKYROL-SH81N, supplied by SKC) to prepare 1 mm-thick sealing sheets.

TABLE 1

| Content (parts by weight) | Polyol Mixture | Prepolymer | Flame Retardant | | | Foaming Agent ($H_2O$) |
|---|---|---|---|---|---|---|
| | | | Melamine Polyphosphate | Diphenyl Cresyl Phosphate | | |
| Example 1 | 100 | 90 | 50 | 10 | | 0.3 |
| Example 2 | 100 | 90 | 50 | 20 | | 0.3 |
| Example 3 | 100 | 90 | 60 | 10 | | 0.3 |
| Example 4 | 100 | 90 | 70 | 10 | | 0.3 |
| Example 5 | 100 | 90 | 70 | 20 | | 0.3 |
| Example 6 | 100 | 90 | 60 | 10 | | 0.8 |
| Comparative Example 1 | — | — | — | — | | 0.3 |
| Comparative Example 2 | — | — | — | — | | 0.8 |

Experimental Examples

The sheets prepared from Examples and Comparative Examples were evaluated or measured in regard to flammability, specific gravity, and permanent compression set. The results are presented in Table 2.

1. Non-Flammability

Flammability was evaluated according to the UL94-HBF standard, which is a stability standard for electrical appliances established and released by Underwriters Laboratories Inc. of USA. The flammability classifications specified in UL94 were determined based on the burn time and the burning length between the flame of a Bunsen or Tirrill burner and a test specimen oriented in the horizontal position on a wire screen. In the horizontal burning foamed material test, where a 150 mm×50 mm rectangular test specimen was ignited in the lengthwise direction, the flammability of the test specimen was evaluated according to whether or not the specimen met the HBF standards: (i) the test specimen had a burning rate not exceeding 40 mm/min over a 100 mm span from the ignition position to a 100 mm mark in the lengthwise direction of the test specimen; and (ii) the ignited specimen ceased to burn before flaming or glowing reaches the 125 mm mark. Here, the 125 mm mark was at 125 mm from the ignition position in the lengthwise of the test specimen.

2. Specific Gravity

The specific gravity of the test specimens was measured according to ASTM D3574.

3. Compressive Strength

Each test specimen was kept at 23□ and 50% RH for 24 hours and measured in regard to compressive strength according to ASTM D3574.

4. Permanent Compression Set

According to ASTM D1667, each test specimen was subjected to 50% compression at 70□ for 22 hours and conditioned at 23□ and 50% RH for 30 minutes, and the thickness difference before and after was measured.

TABLE 2

| | Specific Gravity (g/cm$^3$) | 25% Compressive Strength (kgf/cm$^2$) | Permanent Compression Set (%) | Non-Flammability |
|---|---|---|---|---|
| Example 1 | 0.4 | 0.25 | 4.2 | ○ |
| Example 2 | 0.4 | 0.21 | 5.4 | ○ |
| Example 3 | 0.4 | 0.23 | 1.2 | ○ |
| Example 4 | 0.4 | 0.27 | 1.2 | ○ |
| Example 5 | 0.4 | 0.25 | 4.0 | ○ |
| Example 6 | 0.2 | 0.13 | 2.3 | ○ |
| Comparative | 0.4 | 0.24 | 4.8 | X |

TABLE 2-continued

| | Specific Gravity (g/cm³) | 25% Compressive Strength (kgf/cm²) | Permanent Compression Set (%) | Non-Flammability |
|---|---|---|---|---|
| Example 1 Comparative Example 2 | 0.2 | 0.12 | 4.9 | X |

A comparison of Examples and Comparative Examples in experimental results revealed that the non-flammable cushioning and sealing sheets of the present invention (Examples 1 to 6), compared to the conventional sealing sheets (Comparative Examples 1 and 2), exhibited non-flammability as well as equivalent or superior properties and achieved the intrinsic functions of the sheet even under high temperature or heat dissipation conditions caused by heat generated from the elements of electronic equipment, so that the sheets of the present invention can be widely used in the manufacture of sealing sheets.

The invention claimed is:

1. A non-flammable cushioning and sealing sheet, having a sequential layered structure comprising an adhesive layer 2, a polyurethane layer 4, and a surface coating layer 6, wherein the polyurethane layer 4 is prepared from a composition comprising:
    100 parts by weight of a polyol mixture;
    50 to 130 parts by weight of a prepolymer; and
    50 to 70 parts by weight of melamine polyphosphate and 10 to 20 parts by weight of diphenyl cresyl phosphate in combination as a flame retardant.

2. The sheet according to claim 1, wherein the polyol mixture comprises at least one polyol selected from the group consisting of polypropylene glycol, polytetramethylene glycol, polyethylene glycol, or 1,4-butanediol.

3. The sheet according to claim 1, wherein the prepolymer comprises:
    at least one diisocyanate selected from the group consisting of methylene diphenyl isocyanate (MDI), toluene diisocyanate (TDI), methylene diphenyl isocyanate (MDI) oligomer, toluene diisocyanate (TDI) oligomer, or carbodiimide-modified methylene diisocyanate; and
    at least one polyol selected from the group consisting of polypropylene glycol, polytetramethylene glycol, or polyethylene glycol.

4. The sheet according to claim 1, wherein the melamine polyphosphate has an average particle diameter of 10 to 50 μm.

5. The sheet according to claim 1, wherein the sheet has a permanent compression set of 0.1 to 10%.

6. The sheet according to claim 1, wherein the sheet has a specific gravity of 0.2 to 0.45 g/cm³.

7. The sheet according to claim 1, wherein the sheet meets the UL94 HBF flame retardant standard.

8. The sheet according to claim 1, wherein the polyurethane layer 4 has a thickness of 0.4 to 3.5 mm.

9. The sheet according to claim 1, wherein the adhesive layer 2 is prepared from at least one selected from the group consisting of vinylacetate, methylmethacrylic acid, ethylacetoacrylate, or sulfonated polystyrene.

10. The sheet according to claim 1, wherein the adhesive layer 2 has a peel strength of at least 150 gr/cm.

11. The sheet according to claim 1, wherein the adhesive layer 2 has a thickness of 5 to 120 μm.

12. The sheet according to claim 1, wherein the surface coating layer 6 is prepared from at least one selected from the group consisting of:
    an acryl-based polymer prepared from an acryl-based monomer or oligomer comprising silicon acrylate, silicon methacrylate, acrylic acid, methacrylic acid, methylmethacrylate, or methylmethacrylic acid;
    a urethane-acrylate copolymer or blend; or
    a vinyl-based polymer comprising polyethylene, polypropylene, polyvinylidene fluoride, or Teflon.

13. The sheet according to claim 1, wherein the surface coating layer 6 has a thickness of 0.5 to 10 μm.

14. The sheet according to claim 1, wherein the sequential layered structure further comprises an adhesive auxiliary layer 8 laminated between the polyurethane layer 4 and the adhesive layer 2.

15. The sheet according to claim 14, wherein the adhesive auxiliary layer 8 is prepared from at least one selected from the group consisting of urethane acrylate; a copolymer of urethane acrylate and acryl-based monomer; or a mixture of urethane and acryl.

16. The sheet according to claim 14, wherein the adhesive auxiliary layer 8 has a thickness of 0.5 to 10 μm.

17. The sheet according to claim 14, wherein the adhesive auxiliary layer 8 has a peel strength of at least 300 gr/cm with respect to the polyurethane layer 4.

18. The sheet according to claim 1, wherein the sheet has a specific gravity of 0.2 to 0.45 g/cm³.

19. A method for preparing the non-flammable cushioning and sealing sheet as claimed in claim 1, comprising:
    preparing the polyurethane layer 4 comprising melamine polyphosphate and diphenyl cresyl phosphate as a flame retardant;
    forming the adhesive layer 2 on the one side of the polyurethane layer 4; and
    forming the surface coating layer 6 on the other side of the polyurethane layer 4 not having the adhesive layer 2 formed thereon.

20. A non-flammable cushioning and sealing sheet, having a sequential layered structure comprising adhesive layer 2, polyurethane layer 4, and surface coating layer 6, wherein the polyurethane layer 4 is prepared from a composition comprising:
    100 parts by weight of a polyol mixture;
    50 to 130 parts by weight of a prepolymer; and
    50 to 70 parts by weight of melamine polyphosphate and 10 to 20 parts by weight of diphenyl cresyl phosphate in combination as a flame retardant; wherein the polyurethane layer 4 has a thickness of 0.4 to 3.5 mm and a permanent compression set of 0.1 to 10%.

* * * * *